US012654523B2

(12) United States Patent
Kim

(10) Patent No.: US 12,654,523 B2
(45) Date of Patent: Jun. 16, 2026

(54) DOOR TRIM COVER DEVICE FOR VEHICLE

(71) Applicants: HYUNDAI MOTOR COMPANY, Seoul (KR); Kia Corporation, Seoul (KR)

(72) Inventor: Hyong Don Kim, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 359 days.

(21) Appl. No.: 18/376,555

(22) Filed: Oct. 4, 2023

(65) Prior Publication Data

US 2024/0300306 A1 Sep. 12, 2024

(30) Foreign Application Priority Data

Mar. 6, 2023 (KR) ........................ 10-2023-0029004

(51) Int. Cl.
B60J 5/04 (2006.01)
E05B 83/38 (2014.01)
(52) U.S. Cl.
CPC ........... B60J 5/0479 (2013.01); B60J 5/0469 (2013.01); E05B 83/38 (2013.01)

(58) Field of Classification Search
CPC ........ B60J 5/0469; B60J 5/0479; E05B 83/38
See application file for complete search history.

(56) References Cited

U.S. PATENT DOCUMENTS

| | | | | |
|---|---|---|---|---|
| 10,822,850 B1 * | 11/2020 | Juarez Espinoza | ...... | B60J 5/107 |
| 2013/0038075 A1 * | 2/2013 | Wilde | ..................... | E05B 81/00 |
| | | | | 292/341.14 |
| 2014/0265377 A1 * | 9/2014 | Gardner | .............. | E05B 47/0001 |
| | | | | 292/341.14 |

FOREIGN PATENT DOCUMENTS

JP 2003237369 A * 8/2003 ........... B60J 5/0479

* cited by examiner

*Primary Examiner* — Daniel J Colilla
(74) *Attorney, Agent, or Firm* — MORGAN, LEWIS & BOCKIUS LLP

(57) ABSTRACT

A door trim cover device for a vehicle is configured so that in a vehicle including no B-pillar, a trim cover is raised by operation of an actuator to enable an operation of opening or closing a door without interference between a lower striker and a door trim while the door is opened or closed with respect to the lower striker on a side sill fastened to a lower latch of the door, and the trim cover is lowered by a reverse operation of the actuator in a closed state of the door so that the trim cover is matched with a body weather strip together with the door trim.

14 Claims, 9 Drawing Sheets

DOOR TRIM COVER DEVICE FOR VEHICLE

CROSS-REFERENCE TO RELATED APPLICATION

The present application claims priority to Korean Patent Application No. 10-2023-0029004 filed on Mar. 6, 2023, the entire contents of which is incorporated herein for all purposes by this reference.

BACKGROUND OF THE PRESENT DISCLOSURE

Field of the Present Disclosure

The present disclosure relates to a door trim cover device for a vehicle, and more particularly, to a door trim cover device for a vehicle, which is configured to automatically open or close an opening portion of a door, which serves as a passageway for a striker provided on a side sill, during an operation of opening or closing the door of the vehicle having no B-pillar.

Description of Related Art

In general, a door for a vehicle separates the inside and the outside of the vehicle and performs important functions of blocking external noise, rainwater, dust, wind, and the like and safely protecting an occupant by absorbing impact together with a side structure in the event of a broadside collision.

There are various types of doors for a vehicle including doors for special purposes. However, hinge type swing doors are widely used for passenger vehicles.

Typically, the swing door refers to a door which is opened toward the outside of a vehicle body about a hinge shaft provided by a hinge bracket disposed between the swing door and the vehicle body. The advantage of the swing door is that the swing door is easily opened or closed and has a simple structure, which makes it easy to maintain and repair the swing door.

Meanwhile, opposite swing doors are applied to some vehicles. The opposite swing doors provide wide openness when opened and make it easy for the occupant to get in or out of the vehicle.

The opposite swing doors are classified into a type having no B pillar and a type having the B pillar.

FIG. 1 and FIG. 2 are side views exemplarily illustrating an example of a vehicle to which opposite swing doors applied without a B-pillar.

With reference to FIG. 1 and FIG. 2, in case that the opposite swing doors applied to the vehicle having no B-pillar, a hinge shaft of a front door DR1 is provided on a vehicle body 100 and a front end portion of the front door DR1, and a hinge shaft of the rear door DR2 is installed on the vehicle body 100 and a rear end portion of the rear door DR2.

In the case of the opposite swing door, a door locking device is provided on the front door DR1 and the rear door DR2 to maintain a locked state.

The door locking device includes a front latch LC1 provided at a center portion of a rear end portion of the front door DR1, and a lower latch LC2 and an upper latch LC3 respectively provided at lower end portion and an upper end portion of the rear door DR2. Furthermore, a front striker ST1 is provided at a center portion of a front end portion of the rear door DR2 while corresponding to the front latch LC1, and lower and upper strikers ST2 and ST3 are respectively provided at one side of a side sill 101 and one side of a roof rail 103 of the vehicle body 100 while corresponding to the lower latch LC2 and the upper latch LC3.

Furthermore, in the case of the vehicle having no B-pillar, a body weather strip 105 is installed along the side sill 101 to maintain sealability between the front door DR1, the rear door DR2, and the vehicle body 100.

As described above, in the case of the vehicle having no B-pillar, the upper and lower latches LC2 and LC3 need to be at least provided at lower and upper end portions of one door DR2, respectively. The lower striker ST2 fastened to the lower latch LC2 is mounted at a center portion of the side sill 101 of the vehicle body 100.

In the instant case, the body weather strip 105 and a door trim (or door internal panel) of the rear door DR2 need to be matched with each other above the lower striker ST2. Therefore, as illustrated in FIG. 1, a mounting surface F2 of the lower striker ST2 needs to be formed as a stepped surface lower than a basic surface F1 of the side sill 101. As illustrated in FIG. 2, a sealing surface F3 of the side sill 101 mounted on the body weather strip 105 needs to be raised to correspond to the lower striker ST2.

However, when the mounting surface F2 of the lower striker ST2 is stepped with respect to the basic surface F1 as described above, there is a problem in that an external appearance is not aesthetic, and an overall cross-section of the side sill 101 also decreases, which adversely affects collision performance.

Furthermore, even in case that the side sill 101, on which the body weather strip 105 is mounted, is raised to correspond to the lower striker LC2, there is a problem in that an external appearance is not aesthetic, and a user's foot may be caught when the user gets in or out of the vehicle, which may cause discomfort.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door trim cover device for a vehicle, in which in a vehicle having no B-pillar, a trim cover is raised by operation of an actuator to enable an operation of opening or closing a door without interference between a lower striker and a door trim while the door is opened or closed with respect to the lower striker on a side sill fastened to a lower latch of the door, and the trim cover is lowered by a reverse operation of the actuator in a closed state of the door so that the trim cover is matched with a body weather strip together with the door trim.

Various aspects of the present disclosure are directed to providing a door trim cover device for a vehicle, the door trim cover device including: an actuator mounted at one side of a door while facing a striker on a side sill of a vehicle body; a gear assembly rotatably mounted on a wheel shaft and having a worm wheel and a pinion that are connected to each other and rotated by the actuator; and a trim cover connected to a rack bar that engages with the pinion to open or close an opening portion in the door that the striker enters or exits.

In the instant case, one side of the door may be one side of a lower portion of a door internal panel.

Furthermore, the door trim cover device may further include a casing provided at one side of the door, in which the actuator is fixed at one side in the casing, the wheel shaft is integrally formed at the other side in the casing, and the trim cover is inserted through a through-hole formed in the casing.

The casing may include: an external casing assembled to one side of a lower portion of the door while corresponding to a striker mounting portion on the side sill of the vehicle body, the external casing including the through-hole formed at one side of a lower-end surface; and an internal casing assembled in the external casing and including a first side including an actuator mounting portion on which the actuator is mounted, and a second side at which the wheel shaft is integrally formed.

Furthermore, the door trim cover device may further include a return spring provided between the internal casing and the gear assembly and configured to provide a restoring elastic force to the gear assembly.

The return spring may be fitted with a wheel shaft on the internal casing, one end portion of the return spring may be supported at a fixing support end portion formed around the wheel shaft, and the other end portion of the return spring may be supported at a rotation support end portion formed on an external surface of the worm wheel on the gear assembly.

In the instant case, the return spring may be configured as a torsional coil spring.

Furthermore, the external casing may be integrated with a guide plate while facing the through-hole and configured to guide upward and downward movements of the rack bar.

The actuator may be configured as a motor configured for controlling a rotation direction and a rotation speed thereof, and the actuator may include a rotation shaft on which a worm gear is provided.

The gear assembly may include: a shaft housing into which the wheel shaft is rotatably inserted; a worm wheel formed at one end portion of the shaft housing and configured to engage with a worm gear fixed on a rotation shaft of the actuator; and a pinion formed at the other end portion of the shaft housing and configured to engage with the rack bar. In the instant case, the pinion may be formed in a fan shape.

One side of an upper portion of the trim cover may be coupled to one side of a lower portion of the rack bar by a pin.

Furthermore, guide protrusions integrally formed at first and second opposite surfaces of the trim cover may be fitted with guide grooves on guiders formed at two opposite sides of the opening portion in the door so that upward and downward movements of the trim cover are guided.

Furthermore, seal strips may be provided at two opposite surfaces of the trim cover, and the seal strips may be in contact with internal surfaces of guiders formed at two opposite sides of the opening portion in the door to seal a portion between the door and the trim cover.

According to the trim cover device according to the exemplary embodiment of the present disclosure, in the vehicle including no B-pillar, the trim cover is raised by operation of the actuator while the door is opened or closed with respect to the striker on the side sill fastened to the lower latch of the door so that the state in which the opening portion in the door, which the striker enters or exits, is maintained, enabling the operation of opening or closing the door without interference between the striker and the trim cover.

Furthermore, in the closed state of the door, the trim cover is moved downwards by the reverse operation of the actuator, and the closed state of the opening portion in the door is maintained so that the trim cover may be matched with the body weather strip together with the door trim and maintain the sealing state.

Therefore, in the trim cover device according to the exemplary embodiment of the present disclosure, the striker on the side sill, which is applied to the existing coach door or the like, may be provided on the basic surface without a level difference without change, and the body weather strip may be straightened and mounted on the side sill.

The existing side sill may be used without being deformed, which may prevent an external appearance from being damaged, suppress deformation of a cross-section, and maintain collision performance without change.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
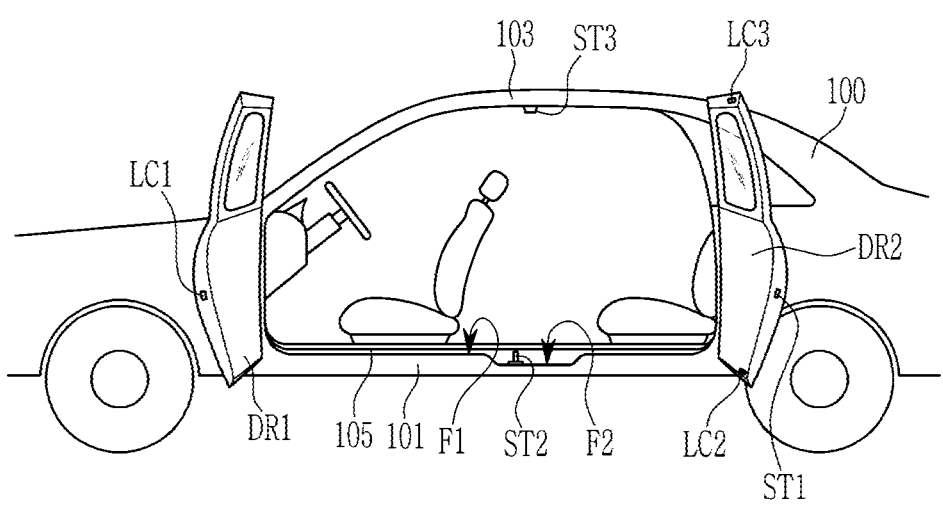
FIG. 1 and FIG. 2 are side views exemplarily illustrating an example of a vehicle to which opposite swing doors applied without a B-pillar.
Figure 2:
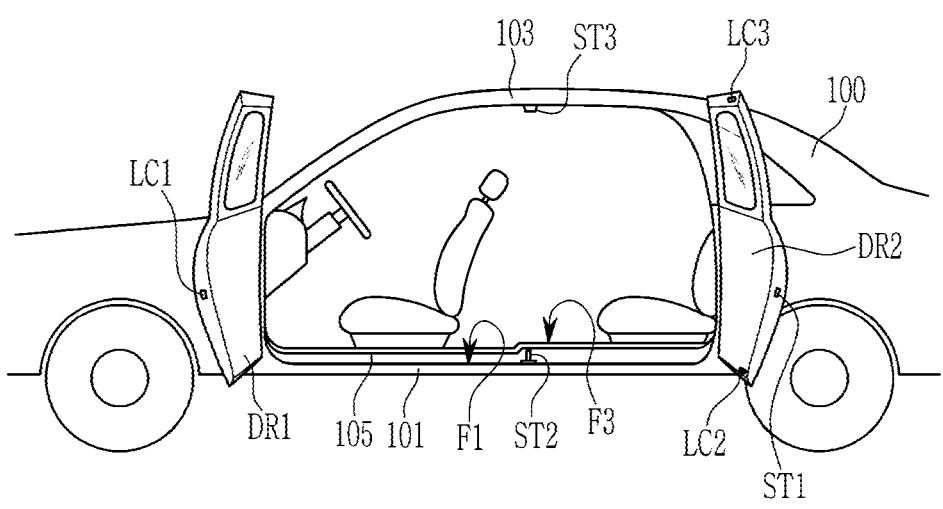

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings.

Furthermore, the size and thickness of each component illustrated in the drawings are arbitrarily shown for ease of description, but the present disclosure is not limited thereto. To clearly describe several portions and regions, thicknesses thereof are enlarged or reduced. Furthermore, a portion irrelevant to the description will be omitted to clearly describe the exemplary embodiment of the present disclosure.

Furthermore, a door trim cover device for a vehicle according to various exemplary embodiments of the present disclosure may be applied to one of front and rear doors of a vehicle having no B-pillar, i.e., applied to a door including a lower latch fastened to a lower striker on a side sill. An example will be described in which the door trim cover device is applied to a lower portion of a rear door in the exemplary embodiment of the present disclosure.

Figure 3:
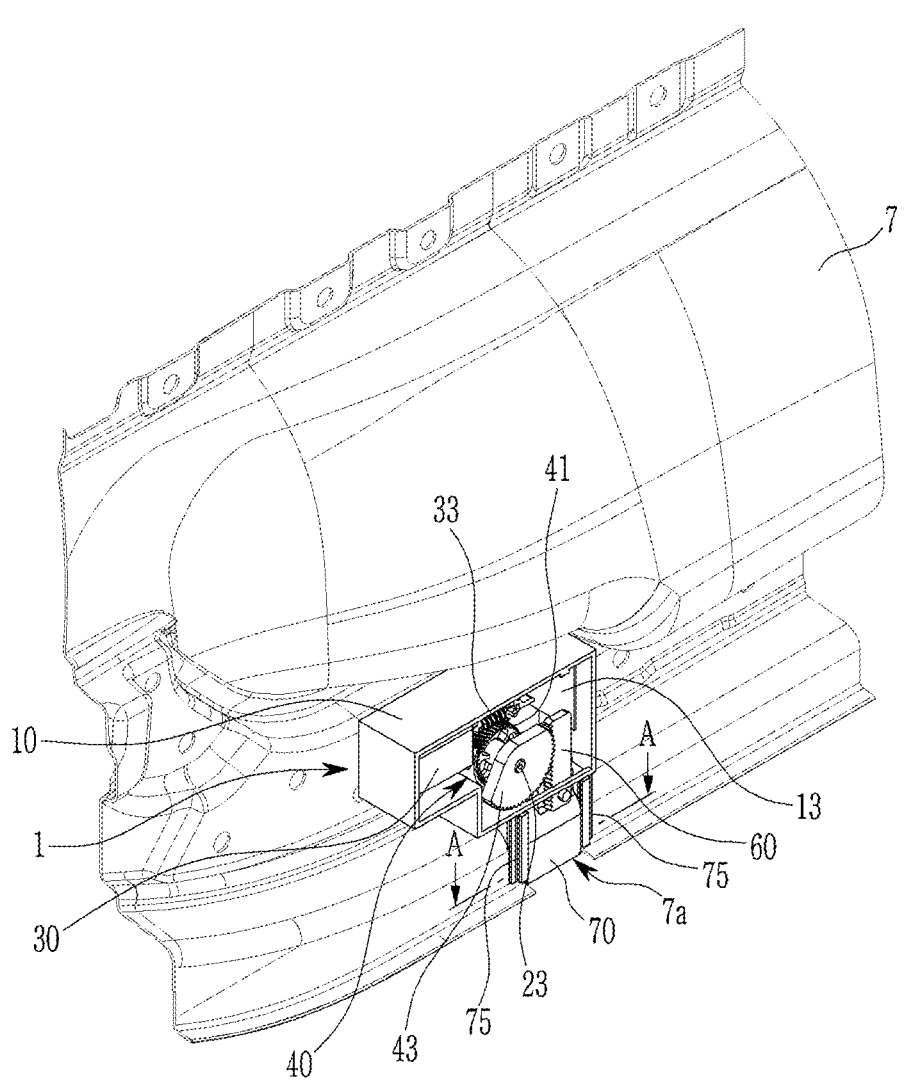
FIG. 3 is an outside perspective view of a door internal panel to which a door trim cover device for a vehicle according to various exemplary embodiments of the present disclosure is applied.
Figure 4:
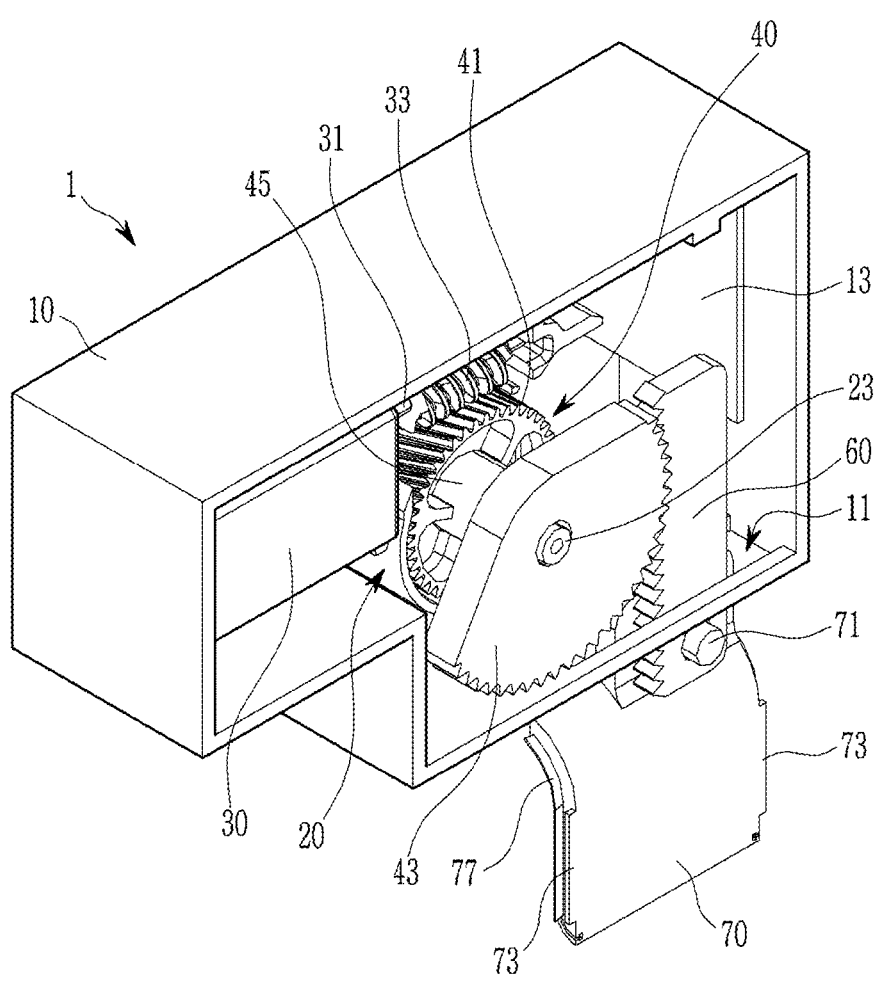
FIG. 4 is an assembled perspective view of the door trim cover device for a vehicle according to the exemplary embodiment of the present disclosure.
Figure 5:
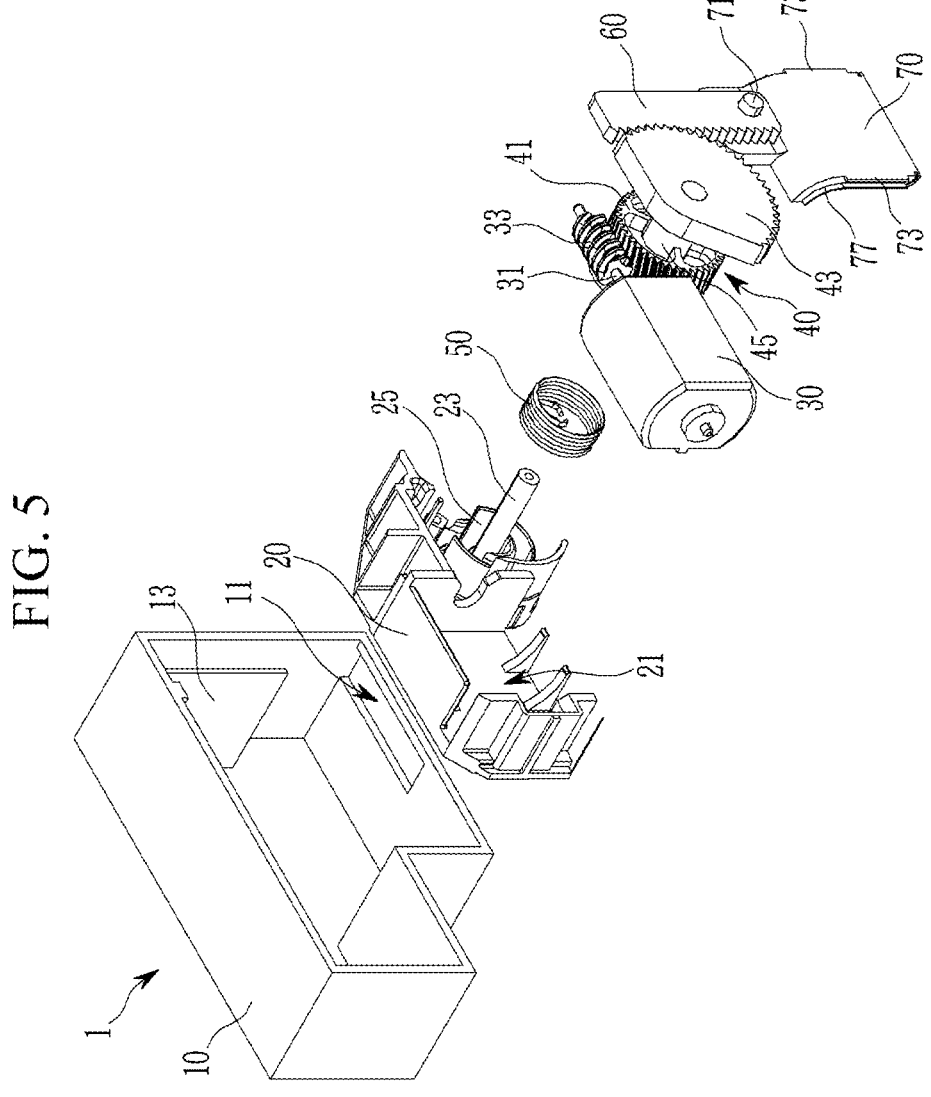
FIG. 5 is an exploded perspective view of the door trim cover device for a vehicle according to the exemplary embodiment of the present disclosure.

FIG. 3 is an outside perspective view of a door internal panel to which a door trim cover device for a vehicle according to various exemplary embodiments of the present disclosure is applied, FIG. 4 is an assembled perspective view of the door trim cover device for a vehicle according to the exemplary embodiment of the present disclosure, and FIG. 5 is an exploded perspective view of the door trim cover device for a vehicle according to the exemplary embodiment of the present disclosure.

With reference to FIG. 3, FIG. 4, and FIG. 5, a door trim cover device 1 for a vehicle according to various exemplary embodiments of the present disclosure includes a casing including an external casing 10 and an internal casing 20, an actuator 30, a gear assembly 40, a return spring 50, a rack bar 60, and a trim cover 70.

The trim cover device 1 may be provided on a lower portion of a door including latches respectively provided at lower and upper end portions of the vehicle having no B-pillar. In the exemplary embodiment of the present disclosure, the trim cover device 1 is provided at one side of a lower portion of a door internal panel 7 to open or close an opening portion 7a formed at a lower end portion of the door internal panel 7 corresponding to a striker mounting portion 5 (see FIG. 8) so that a striker 5a (see FIG. 8) mounted on a side sill 3 (see FIG. 8) of a vehicle body enters or exits the opening portion 7a.

Figure 8:
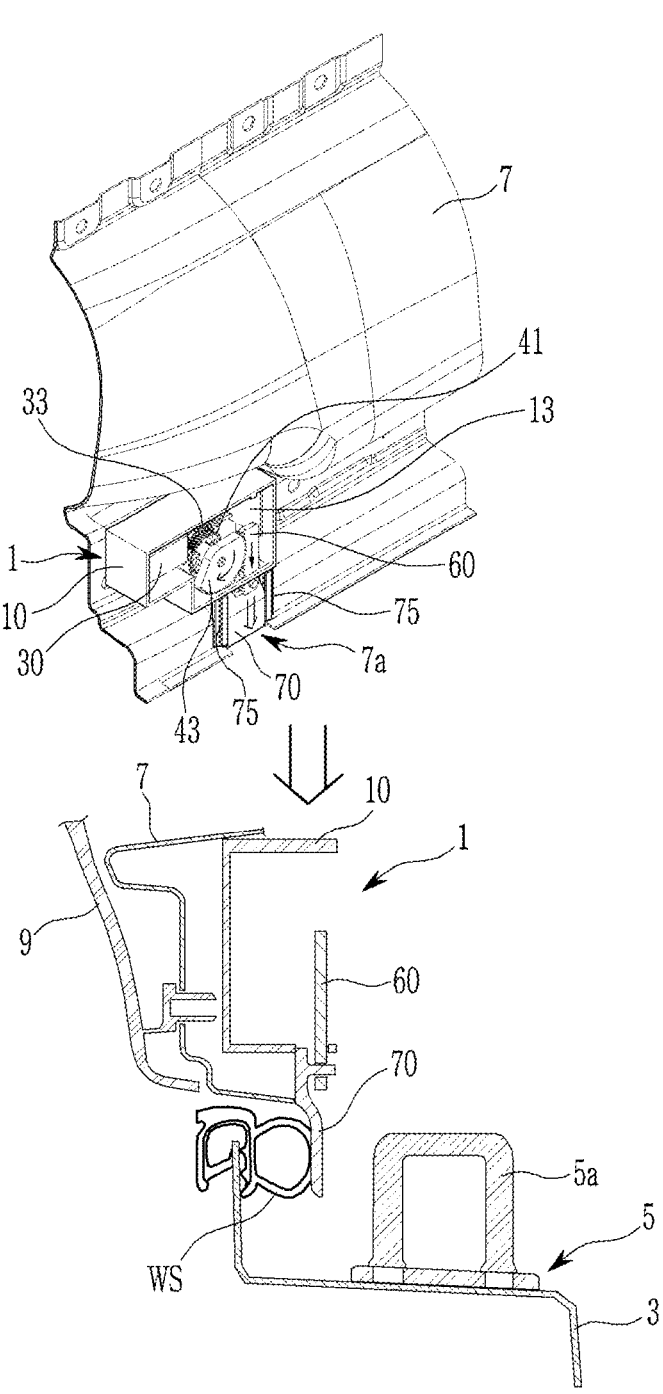
FIG. 8 and FIG. 9 are views operating states for respective steps of the door trim cover device for a vehicle according to the exemplary embodiment of the present disclosure.

If the opening portion is formed in a door trim while corresponding to the striker mounting portion, the trim cover device 1 may be provided at one side of the lower portion of the door trim 9 (see FIG. 8).

First, the external casing 10 of the casing is assembled to one side of a lower portion of the door internal panel 7 while corresponding to the striker mounting portion 5 (see FIG. 8) on the side sill 3 (see FIG. 8) of the vehicle body.

A quadrangular through-hole 11 is formed at one side of a lower-end surface of the external casing 10. A guide plate 13 is integrally formed in an upward/downward direction while facing the through-hole 11 to guide upward or downward movements of the rack bar 60.

Furthermore, the internal casing 20 of the casing is assembled in the external casing 10. To mount the actuator 30, an actuator mounting portion 21 is formed at one side, and a wheel shaft 23 is integrated at the other side thereof.

The internal casing 20 positions the actuator 30, the return spring 50, and the gear assembly 40 and fixes the actuator 30, the return spring 50, and the gear assembly 40 in the external casing 10.

Furthermore, the actuator 30 is assembled onto the actuator mounting portion 21 in the internal casing 20.

The actuator 30 is configured as a motor configured for controlling a rotation direction and a rotation speed thereof. A worm gear 33 is provided on a rotation shaft 31 of the actuator 30.

The gear assembly 40 includes a worm wheel 41 and a pinion 43 that are integrated. The gear assembly 40 is rotatably provided on the wheel shaft 23 and rotated by the actuator 30.

That is, the wheel shaft 23 of the gear assembly 40 is rotatably inserted into a shaft housing 45. The worm wheel 41 is formed at one end portion of the shaft housing 45 and engages with the worm gear 33.

Furthermore, the pinion 43 is formed at the other end portion of the shaft housing 45 and engages with the rack bar 60.

In the instant case, an example is illustrated in which the pinion 43 is formed in a fan shape to correspond to a stroke of the rack bar 60. However, the present disclosure is not necessarily limited thereto. The pinion 43 may be configured as a circular pinion.

Figure 6:
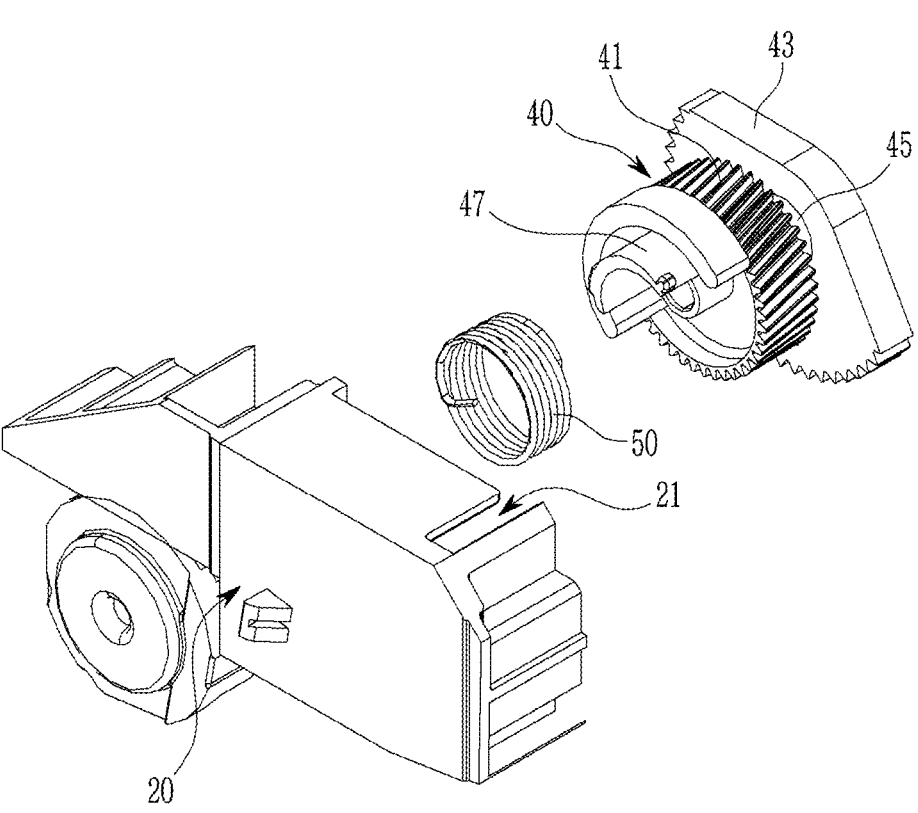
FIG. 6 is an exploded perspective view of an internal casing and a gear assembly applied to the trim cover device according to the exemplary embodiment of the present disclosure.

FIG. 6 is an exploded perspective view of the internal casing and the gear assembly applied to the trim cover device according to the exemplary embodiment of the present disclosure.

With reference to FIG. 6, the return spring 50 is provided between the internal casing 20 and the gear assembly 40 and configured as a torsional coil spring to provide a restoring elastic force to the gear assembly 40.

That is, the return spring 50 is fitted with the wheel shaft 23 on the internal casing 20, and one end portion of the return spring 50 is supported at a fixing support end portion 25 formed around the wheel shaft 23.

Furthermore, the other end portion of the return spring 50 is supported at a rotation support end portion 47 formed on an external surface of the worm wheel 41 on the gear assembly 40.

Therefore, one end portion of the return spring 50 is supported at the fixing support end portion 25, and the other end portion of the return spring 50 elastically supports the rotation support end portion 47. A state in which the trim cover 70 is lowered is set to an initial position of the return spring 50, and the return spring 50 provides a restoring elastic force to the gear assembly 40.

Furthermore, the rack bar 60 is inserted through a through-hole 11 of the external casing 10 and engages with the pinion 43. Therefore, the rack bar 60 is configured to be moved upward or downward by a rotation of the gear assembly 40.

Furthermore, the trim cover 70 is coupled to a lower side of the rack bar 60.

Figure 7:
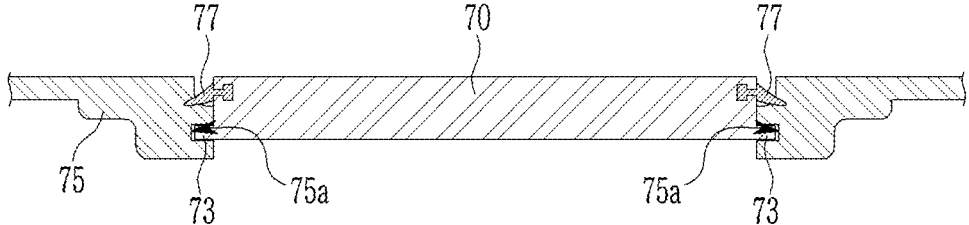
FIG. 7 is a cross-sectional view taken along line A-A in FIG. 3.

FIG. 7 is a cross-sectional view taken along line A-A in FIG. 3.

With reference to FIG. 7, one side of an upper portion of the trim cover 70 is pin-coupled to one side of a lower portion of the rack bar 60 by a pin 71.

Guide protrusions 73 are integrated with two opposite surfaces of the trim cover 70. The guide protrusions 73 are fitted with guide grooves 75a on guiders 75 formed at two opposite sides of the opening portion 7a of the door internal panel 7 so that the upward and downward movements of the guide protrusions 73 are guided.

Furthermore, seal strips 77 are provided to be fitted with two opposite surfaces of the trim cover 70. The seal strips 77 are in contact with two opposite internal surfaces of the guiders 75 formed at the two opposite sides of the opening portion 7a of the door internal panel 7 so that the seal strips 77 are configured to seal the portions between the door internal panel 7 and the trim cover 70.

Hereinafter, an operation for each step of the door the trim cover device 1 for a vehicle according to the exemplary embodiment of the present disclosure will be described with reference to FIG. 8 and FIG. 9.

Figure 9:
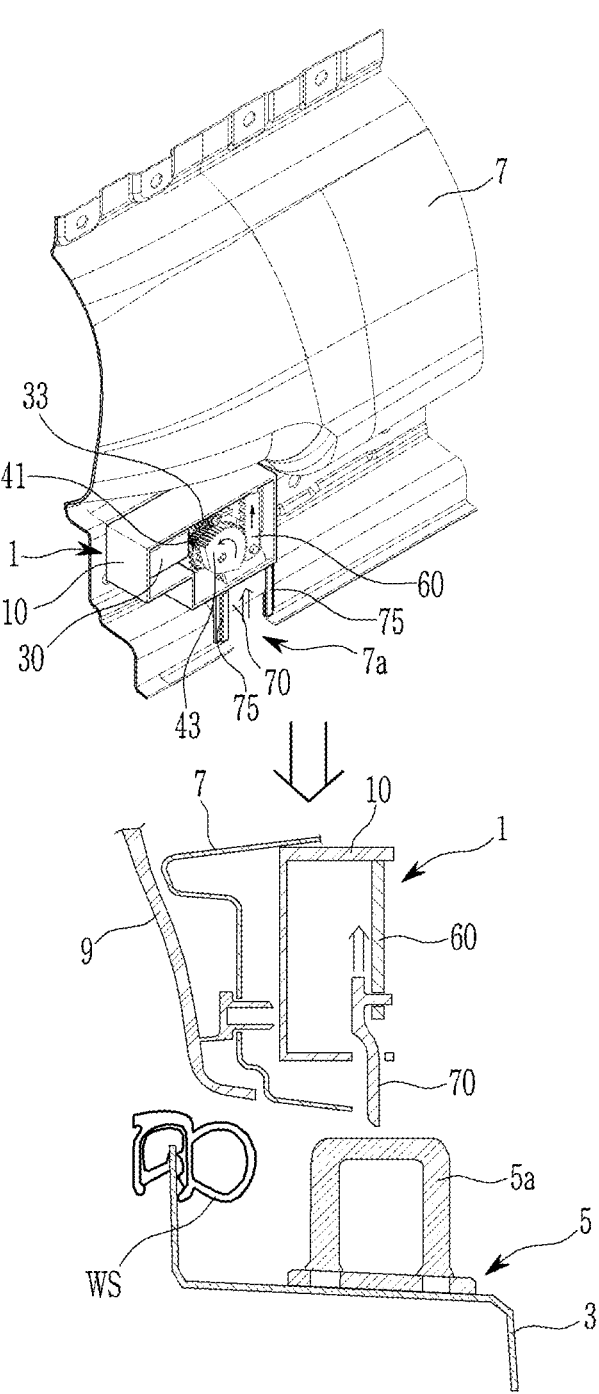

FIG. 8 and FIG. 9 are views operating states for respective steps of the door trim cover device for a vehicle according to the exemplary embodiment of the present disclosure.

First, with reference to FIG. 8, when the door is in a closed state, i.e., in a state in which the trim cover 70 is lowered, the opening portion 7a of the door internal panel 7 is closed and matched with a body weather strip WS, sealing a portion between the door and the vehicle body.

As described above, in the closed state of the door, the trim cover 70 is lowered by a restoring elastic force of the return spring 50 without applying a driving signal to the actuator 30 so that the opening portion 7a of the door internal panel 7 is kept in a sealed state.

With reference to FIG. 9, when the actuator 30 receives a door opening signal in the closed state of the door, the actuator 30 rotates. Therefore, when the worm gear 33 rotates the worm wheel 41, the pinion 43 connected to the worm wheel 41 rotates to raise the rack bar 60.

Therefore, the trim cover 70 connected to the rack bar 60 moves upward along the guiders 75 disposed at the two opposite sides and opens the opening portion 7a of the door internal panel 7. In the instant state, the trim cover 70 opens the door while moving out without interfering with the striker 5a on the side sill 3.

As described above, the state in which the opening portion 7a of the door internal panel 7 is opened by the upward movement of the trim cover 70 is maintained while the door is opened or closed. When the door comes back into the closed state, the actuator 30 rotates reversely while receiving a door closing signal and restores the trim cover 70 to the initial position, as illustrated in FIG. 8.

That is, while the door is opened or closed with respect to the striker 5a on the side sill 3 fastened to the lower latch of the door in the vehicle having no B-pillar, the trim cover 70 of the trim cover device 1 is moved upward and raised by operation of the actuator 30, maintaining the opened state of the opening portion 7a of the door internal panel 7.

Therefore, the door may be opened or closed without interference between the striker 5a and the trim cover 70.

Furthermore, in the closed state of the door, the trim cover 70 is moved downwards and lowered by a reverse operation of the actuator 30 so that the sealing is maintained in the state in which the trim cover 70 is matched with the body weather strip WS together with the door trim 9 in the state in which the opening portion 7a of the door internal panel 7 is closed.

Therefore, in the trim cover device 1 according to the exemplary embodiment of the present disclosure, the striker 5a on the side sill 3, which is applied to the existing coach door or the like, may be provided without a level difference without change, and the body weather strip WS may be straightened and mounted on the side sill 3.

Therefore, it is possible to prevent an external appearance of the side sill 3 from being damaged, suppress deformation of a cross-section, and maintain collision performance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A trim cover apparatus for a vehicle door, the trim cover apparatus comprising:
    an actuator mounted at one side of a door while facing a striker on a side sill of a vehicle body;
    a gear assembly rotatably mounted on a wheel shaft and including a worm wheel and a pinion that are connected to each other and rotated by the actuator; and
    a trim cover connected to a rack bar that engages with the pinion to open or close an opening portion in the door that the striker enters or exits.

2. The trim cover apparatus of claim 1, wherein the one side of the door is one side of a lower portion of a door internal panel.

3. The trim cover apparatus of claim 1, further including:
    a casing provided at the one side of the door, wherein the actuator is fixed at a first side in the casing, the wheel shaft is integrally is formed at a second side in the casing, and the trim cover is inserted through a through-hole formed in the casing.

4. The trim cover apparatus of claim 3, wherein the casing includes:

an external casing assembled to one side of a lower portion of the door while corresponding to a striker mounting portion on the side sill of the vehicle body, the external casing including the through-hole formed at one side of a lower-end surface in the external casing; and an internal casing assembled in the external casing and including a first side including an actuator mounting portion on which the actuator is mounted, and a second side at which the wheel shaft is integrally formed.

5. The trim cover apparatus of claim 4, further including a return spring provided between the internal casing and the gear assembly and configured to provide a restoring elastic force to the gear assembly.

6. The trim cover apparatus of claim 5, wherein the return spring is fitted with the wheel shaft on the internal casing, a first end portion of the return spring is supported at a fixing support end portion formed around the wheel shaft, and a second end portion of the return spring is supported at a rotation support end portion formed on an external surface of the worm wheel on the gear assembly.

7. The trim cover apparatus of claim 5, wherein the return spring is configured as a torsional coil spring.

8. The trim cover apparatus of claim 4, wherein the external casing is integrated with a guide plate while facing the through-hole and configured to guide upward and downward movements of the rack bar.

9. The trim cover apparatus of claim 1, wherein the actuator is configured as a motor configured for controlling a rotation direction and a rotation speed thereof, and the actuator includes a rotation shaft on which a worm gear engaged to the worm wheel is provided.

10. The trim cover apparatus of claim 1, wherein the gear assembly includes:

a shaft housing into which the wheel shaft is rotatably inserted;

the worm wheel formed at a first end portion of the shaft housing and configured to engage with a worm gear fixed on a rotation shaft of the actuator; and the pinion formed at a second end portion of the shaft housing, connected to the worm wheel, and configured to engage with the rack bar.

11. The trim cover apparatus of claim 10, wherein the pinion is formed in a fan shape.

12. The trim cover apparatus of claim 1, wherein one side of an upper portion of the trim cover is coupled to one side of a lower portion of the rack bar by a pin.

13. The trim cover apparatus of claim 1, wherein guide protrusions integrally formed at first and second opposite surfaces of the trim cover are fitted with guide grooves on guiders formed at first and second opposite sides of the opening portion in the door so that upward and downward movements of the trim cover are guided by the guide grooves.

14. The trim cover apparatus of claim 1, wherein seal strips are provided at first and second opposite surfaces of the trim cover, and the seal strips are in contact with internal surfaces of guiders formed at first and second opposite sides of the opening portion in the door to seal a portion between the door and the trim cover.

\* \* \* \* \*